US011585712B2

(12) United States Patent
Carini et al.

(10) Patent No.: US 11,585,712 B2
(45) Date of Patent: Feb. 21, 2023

(54) FIBER OPTIC LOAD SENSORS AND SYSTEMS THEREFOR

(71) Applicant: Simmonds Precision Products, Inc., Vergennes, VT (US)

(72) Inventors: Peter J. Carini, Underhill, VT (US); David H. Crowne, Weybridge, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 133 days.

(21) Appl. No.: 17/111,836

(22) Filed: Dec. 4, 2020

(65) Prior Publication Data

US 2022/0057283 A1 Feb. 24, 2022

Related U.S. Application Data

(60) Provisional application No. 63/068,793, filed on Aug. 21, 2020.

(51) Int. Cl.
*G01L 11/02* (2006.01)
(52) U.S. Cl.
CPC .................... *G01L 11/025* (2013.01)
(58) Field of Classification Search
None
See application file for complete search history.

(56) References Cited

U.S. PATENT DOCUMENTS

| 4,463,254 A | 7/1984 | Asawa et al. |
| 4,815,855 A | 3/1989 | Dixon |
| 5,276,501 A | 1/1994 | McClintock et al. |
| 6,016,702 A | 1/2000 | Maron |
| 6,101,884 A | 8/2000 | Haake |
| 6,496,265 B1 | 12/2002 | Duncan et al. |
| 6,626,043 B1 | 9/2003 | Bailey et al. |
| 7,043,102 B2 | 5/2006 | Okamoto et al. |
| 7,259,862 B2 | 8/2007 | Duplain |

(Continued)

FOREIGN PATENT DOCUMENTS

| EP | 1586867 A2 | 10/2005 |
| KR | 1643914 | 8/2016 |

OTHER PUBLICATIONS

Partial European search report issued in corresponding EP application No. 21192654.8, dated Jan. 18, 2022 (18 pages).

(Continued)

*Primary Examiner* — Andre J Allen
*Assistant Examiner* — Jermaine L Jenkins
(74) *Attorney, Agent, or Firm* — Locke Lord LLP; Daniel J. Fiorello; Gabrielle L. Gelozin

(57) ABSTRACT

A load sensing system for sensing a load on a structure can include an optical load sensing element configured to change an optical state based on a force applied thereto, an optical source operatively connected to the optical load sensing element and configured to input an input optical signal to the optical load element, and an optical detector configured to receive a returned optical signal from the optical load sensing element. The optical detector can be configured to detect one or more frequency peaks of the returned optical signal and to use the one or more frequency peaks of the returned optical signal to correlate to a load value of the load and output the load value indicative of the load.

18 Claims, 3 Drawing Sheets

(56) References Cited

U.S. PATENT DOCUMENTS

| | | | |
|---|---|---|---|
| 11,199,462 B1* | 12/2021 | Sotoudeh | G01L 11/025 |
| 2009/0177095 A1 | 7/2009 | Aeby et al. | |
| 2009/0282928 A1* | 11/2009 | Sheverev | G01D 5/268 |
| | | | 73/800 |
| 2010/0277329 A1 | 11/2010 | Worzyk | |
| 2010/0326200 A1* | 12/2010 | Sheverev | G01B 11/165 |
| | | | 73/800 |
| 2011/0007996 A1 | 1/2011 | Huffman | |
| 2018/0259385 A1* | 9/2018 | Cedilnik | G01H 9/004 |

OTHER PUBLICATIONS

Extended European Search Report, of the European Patent Office, dated May 19, 2022, in corresponding European Patent Application No. 21192654.8.

* cited by examiner

FIBER OPTIC LOAD SENSORS AND SYSTEMS THEREFOR

CROSS REFERENCE TO RELATED APPLICATION

This application claims the benefit of priority to U.S. Provisional Patent Application Ser. No. 63/068,793, filed on Aug. 21, 2020, the disclosure of which is incorporated herein by reference in its entirety.

FIELD

This disclosure relates to fiber optic load sensors and systems therefor.

BACKGROUND

During the operation of an aircraft, numerous on-board components and subsystems are continuously or periodically monitored. Various methods for monitoring these components and sub-systems of the aircraft have been used. For example, sensors and/or transducers can be mechanically affixed to an aircraft at specific locations so as to produce signals indicative of various physical phenomena experienced at those specific locations. In certain systems, to interrogate structures of concern, one or more transducers can generate an acoustic signal and couple the generated acoustic signal to the aircraft at the specific location(s) at which the one or more transducers are affixed. Additionally, acoustic sensors can be affixed to locations of the aircraft and then can sense the acoustic condition at the affixed locations and generate signals indicative of the sensed acoustic condition. These signals can then be transmitted to an analyzer that interprets the signals received by the analyzer.

The analyzer can then compare the received signals indicative of the sensed acoustic condition with baseline and/or reference signals. If the sensed acoustic signals are sufficiently different from the baseline and/or reference signals, the analyzer can generate an alert signal and/or control the transducers so as to perform a more detailed probing of the acoustic condition of the aircraft to monitor the health of the aircraft. Such health monitoring scans can take a long time to perform if much detailed information is required. Such detailed health monitoring scans can require high power and/or energy to complete.

Such conventional methods and systems have generally been considered satisfactory for their intended purpose. However, there is still a need in the art for improved fiber optic load sensors and systems therefor. The present disclosure provides a solution for this need.

SUMMARY

A load sensing system for sensing a load on a structure can include an optical load sensing element configured to change an optical state based on a force applied thereto, an optical source operatively connected to the optical load sensing element and configured to input an input optical signal to the optical load element, and an optical detector configured to receive a returned optical signal from the optical load sensing element. The optical detector can be configured to detect one or more frequency peaks of the returned optical signal and to use the one or more frequency peaks of the returned optical signal to correlate to a load value of the load and output the load value indicative of the load.

In certain embodiments, the optical load sensing element can be a Fabry Perot load sensor having at least a first reflector and a second reflector. Each reflector can be parallel and/or coaxially disposed and spaced to form a cavity therebetween. At least one of the first reflector and the second reflector can be moveable (e.g., deformable, flexible, slidable) relative to each other such that a cavity distance between the first reflector and the second reflector is related to the load. The one or more frequency peaks can correlate to one or more wavelengths of the returned optical signal which correlate to the cavity distance. Any suitable Fabry Perot load sensor as appreciated by those having ordinary skill in the art is contemplated herein.

In certain embodiments, the system does not include an interferometer (e.g., as one is not necessary using peak detection). The optical source can be a narrow band source of less than about 40 nm range. The optical source can be a laser emitter, for example.

The system can include an optical cable between the one or more of the optical source or the optical detector and the optical load sensing element. At least a portion of the optical cable can be at least partially non-parallel with a direction of the load.

In certain embodiments, one of the first reflector and the second reflector can be attached to a first structure portion. The second reflector can be attached to a second structure portion configured to move and/or flex relative the first structure due to the load.

The first structure portion can include a threaded receiver. The second structure portion can include a threaded member meshed with the threaded receiver to place the second reflector relative to the first reflector and to define the cavity. The threads of the threaded receiver and threaded member can be configured to flex (e.g., on the order of nanometers) due to the load applied axially to one or both of the threaded member and/or the threaded receiver. Any suitable arrangement configured to allow some relative motion (e.g., about 40 nm or less of relative motion) between the reflectors is contemplated herein.

The first structure portion can include a coupler connected to the first reflector to axially output the input optical signal and an optical connector port on an outer surface of the first structure portion and in optical communication with coupler. The optical connector port can be configured to output the returned optical signal non-axially or to receive the input optical signal non-axially.

In certain embodiments, the optical load sensing element can be at least partially disposed within a pressure chamber. A pressure applied to the optical load sensing element can correlate to the load applied to the pressure chamber. The optical load sensing element can be completely disposed within the pressure chamber, wherein an optical cable passes through the pressure chamber in a sealed relationship.

The first reflector can have a different index of refraction than the second reflector. The reflectivity of the first reflector can be less than or equal to the reflectivity of the second reflector. In certain embodiments, the reflectors can be sapphire crystal.

In certain embodiments, the optical detector can include a map configured to correlate frequency peaks to the cavity distance and/or load value as a function of temperature to account for temperature variation effects. The optical detector can include any suitable optical hardware and any suitable computer hardware and/or software configured to perform any suitable functions disclosed herein, e.g., described above.

In accordance with at least one aspect of this disclosure, an optical load sensing element can include a Fabry Perot load sensor having at least a first reflector and a second reflector, each reflector parallel and/or coaxially disposed and spaced to form a cavity therebetween. At least one of the first reflector and the second reflector can be moveable relative to each other such that a cavity distance between the first reflector and the second reflector is related to the load. The first reflector can have a different index of refraction than the second reflector. The optical load sensing device can be any suitable embodiment of an optical load sensing device disclosed herein, e.g., described above.

In accordance with at least one aspect of this disclosure, a method of determining a load applied to an optical load sensing element can include using narrow-band peak detection. Narrow-band peak detection can include receiving a returned optical signal, determining a plurality of frequency peaks (e.g., using a Fast Fourier Transform and/or any other suitable peak detection methodology), correlating the frequency peaks to a cavity wavelength and/or a cavity distance, and correlating the cavity wavelength and/or cavity distance to a load value. The method can include any other suitable method(s) and/or portion(s) thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
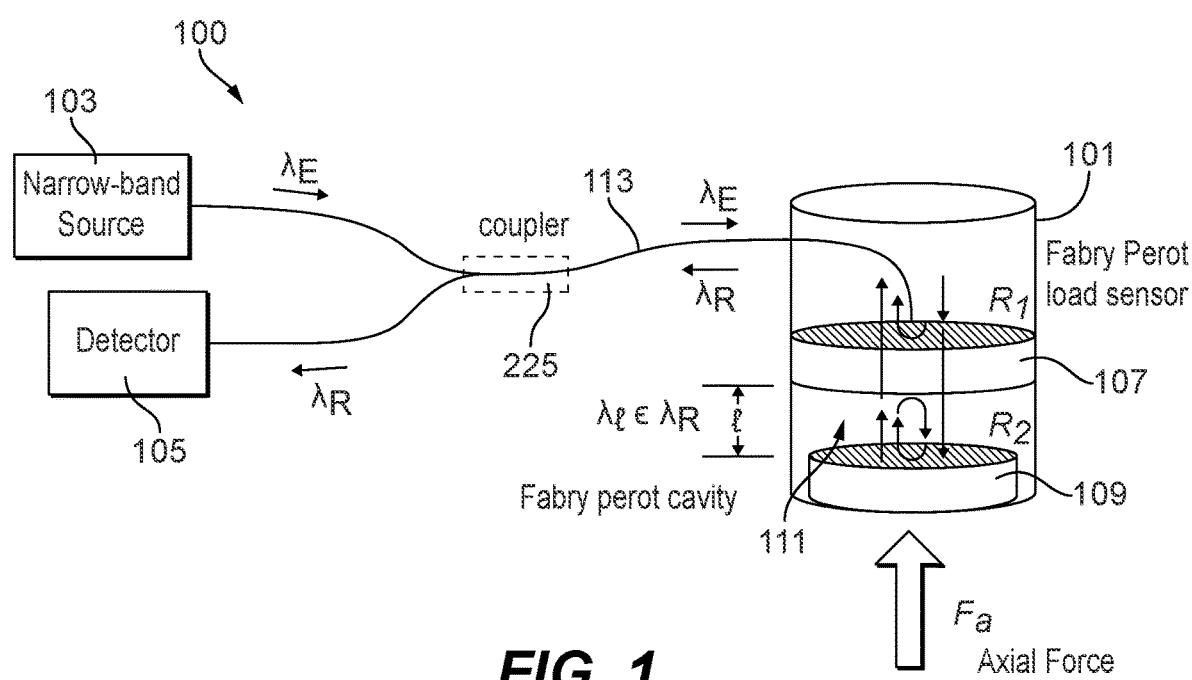
FIG. 1 is a schematic view of an embodiment of a system in accordance with this disclosure.
Figure 2:
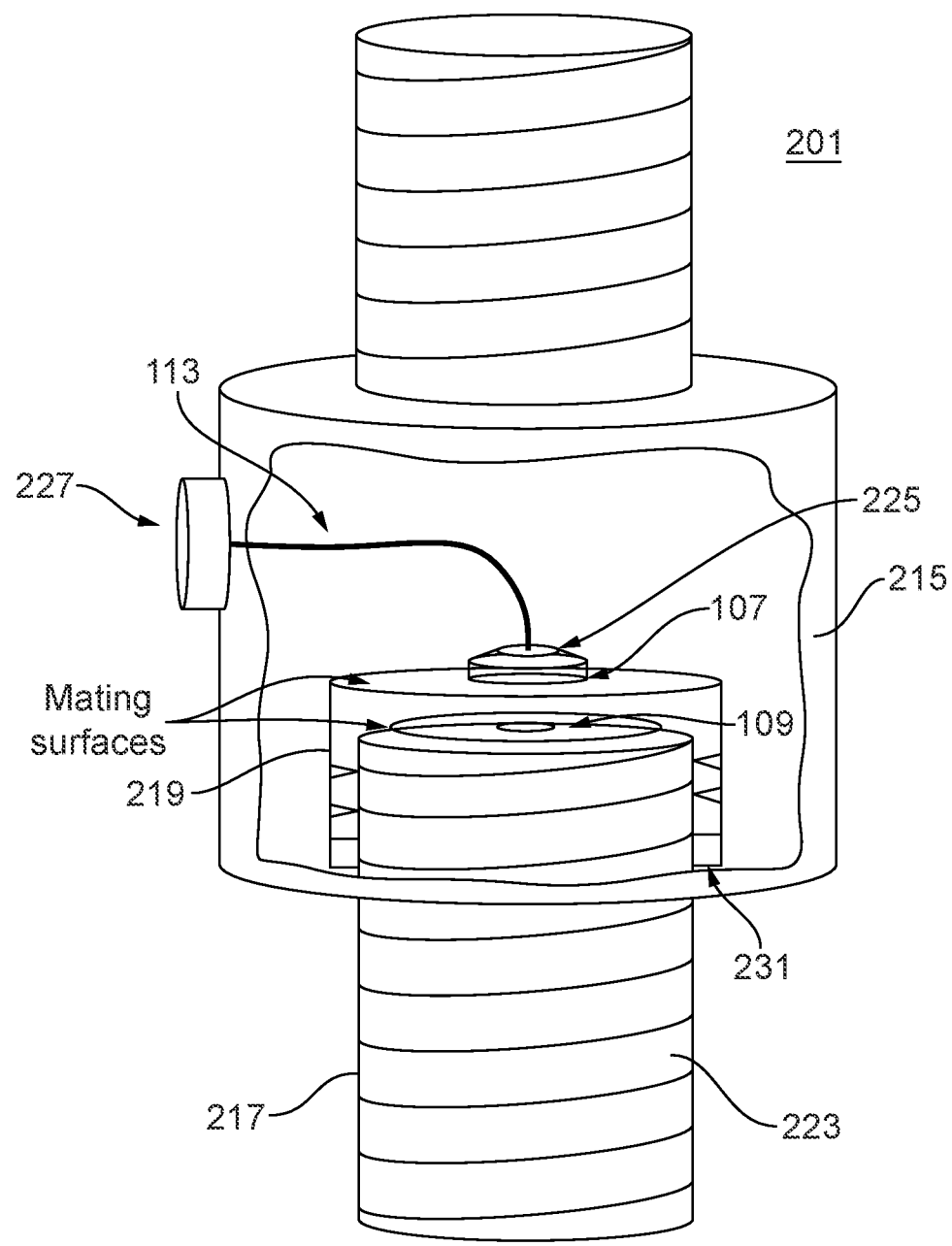
FIG. 2 is a schematic diagram of an embodiment of an optical load sensing element in accordance with this disclosure.
Figure 3:
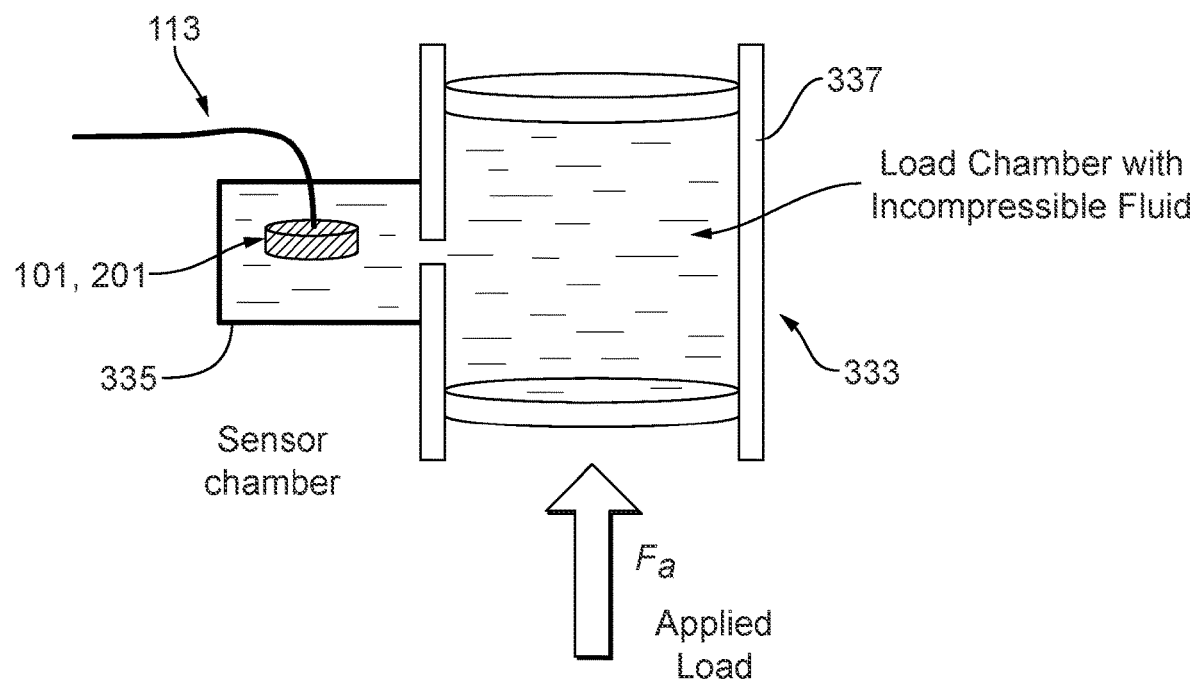
FIG. 3 is a schematic view of an embodiment of an optical load sensing element disposed in an embodiment of a pressure cavity in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2 and 3. Certain embodiments described herein can be used to provide load sensing (e.g., integrated into a strut or other suitable aircraft structure or vehicle parts thereof).

In accordance with at least one aspect of this disclosure, referring to FIG. 1, a load sensing system 100 for sensing a load on a structure (e.g., an aircraft strut, wing, pylon, fuel tank, etc.) can include an optical load sensing element 101 configured to change an optical state (e.g., a change in optical path length between components therein, a change in index of refraction, polarization, etc.) based on a force applied thereto (e.g., axially as shown in FIG. 1). The system 100 can include an optical source 103 operatively connected to the optical load sensing element 101 and configured to input an input optical signal $\lambda_E$ (e.g., a narrow band light signal) to the optical load element 101.

The system 100 can include an optical detector 105 configured to receive a returned optical signal $\lambda_R$ from the optical load sensing element 101. The optical detector 105 can be configured to detect one or more frequency peaks (e.g., determined using a Fourier transform or peak determination algorithm) of the returned optical signal $\lambda_R$ and to use the one or more frequency peaks of the returned optical signal $\lambda_R$ to correlate to a load value of the load (e.g., force $F_a$) and output the load value indicative of the load (e.g., an exact force value, an estimate force value, etc.).

In certain embodiments, the optical load sensing element 101 can be a Fabry Perot load sensor (e.g., as shown in FIG. 1) having at least a first reflector 107 and a second reflector 109. Each reflector 107, 109 can be parallel and/or coaxially disposed (e.g., as shown in FIGS. 1 and 2) and spaced to form a cavity 111 therebetween. At least one of the first reflector 107 and the second reflector 109 can be moveable (e.g., deformable, flexible, slidable, and/or any other suitable type of moveable) relative to each other such that a cavity distance e between the first reflector 107 and the second reflector 109 is related to the load (e.g., $F_a$). The one or more frequency peaks can correlate to one or more wavelengths $\lambda l$ of the returned optical signal $\lambda_R$ which correlate to the cavity distance e. Any suitable Fabry Perot load sensor as appreciated by those having ordinary skill in the art is contemplated herein, for example.

As first reflector 107 can be at least partially transmissive to certain wavelengths (e.g., around the band of wavelengths near the cavity length). One or more wavelengths corresponding to the cavity length (e.g., a wavelength that is a multiple of the cavity length) can resonate within the cavity, e.g., as shown, and be returned with the returned optical signal $\lambda_R$. As shown $\lambda l$ can be included in $\lambda_R$. A frequency analysis (e.g., Fourier transform) can then show a spike at frequencies corresponding to a multiple of $\lambda l$.

In certain embodiments, e.g., as shown, the system 100 does not include an interferometer (e.g., as one is not necessary using peak detection). The optical source 103 can be a narrow band source of less than about 40 nm range, for example. The optical source 103 can be a laser emitter, for example. In certain embodiments, the optical source may be of wider band (e.g., for many sensors) however can be more efficient to only generate a source that sufficiently covers the reflected spectrum of excursion for the set of all sensors, even with no wavelength overlap.

The system 100 can include an optical path (e.g., cable) 113 between the one or more of the optical source 103 or the optical detector 105 (e.g., both as shown) and the optical load sensing element 101. At least a portion of the optical cable 113 can be at least partially non-parallel with a direction of the load (e.g., non-axial as shown such that the cable 113 exits from a side of the sensor 101).

As shown in FIG. 2, in certain embodiments, one of the first reflector 107 and the second reflector 109 can be attached to a first structure portion 215. The second reflector 109 can be attached to a second structure portion 217 configured to move and/or flex relative the first structure 215 due to the load.

The first structure portion 215 can include a threaded receiver 219. The second structure portion 217 can include a threaded member 221 meshed with the threaded receiver 219 to place the second reflector 109 relative to the first reflector 107 and to define the cavity. The threads 223 of the threaded receiver 219 and threaded member 223 can be configured to flex (e.g., on the order of nanometers) due to the load applied axially to one or both of the threaded member 221 and/or the threaded receiver 219. Any suitable arrangement configured to allow some relative motion (e.g., about 40 nm or less of relative motion) between the reflectors 107, 109 is contemplated herein. Any suitable structure in the load path can be configured to move (e.g., flex, deform, bend, slide, etc.) to allow relative motion.

The first structure portion 215 can include a coupler 225 connected to the first reflector 107 to axially output the input optical signal. The first structure portion 215 can include an optical connector port 227 on an outer surface (e.g., an outer side surface, and outer diameter radially spaced from the axis of the center) of the first structure portion 217 and in optical communication with coupler 225. The optical connector port 227 can be configured to output the returned optical signal non-axially (e.g., at least partially sideways and/or perpendicular to the axial direction) to receive the input optical signal non-axially.

In certain embodiments, the first reflector portion 215 can include a threaded rod end 229 to allow threaded mounting to another structure. In certain embodiments, the threaded member 223 can be sealed within the threaded receiver 219 with a seal 231 (e., an o-ring).

In certain embodiments, referring to FIG. 3, the optical load sensing element 101, 201 can be at least partially disposed within a pressure chamber 333 (e.g., comprising a sensor chamber 335 and a load chamber 337). A pressure applied to the optical load sensing element 101, 201 can correlate to the load applied (e.g., $F_a$) to the pressure chamber 333. The optical load sensing element 101, 201 can be completely disposed within the pressure chamber 333 (e.g., sensor chamber 335) and an optical cable 113 (e.g., a fiber optic) passes through the pressure chamber 333 in a sealed relationship. Any other suitable placement and/or mounting of the element 101, 201 such that it can be acted upon by a fluid (e.g., and incompressible fluid) within pressure chamber 333 is contemplated herein.

In certain embodiments, the first reflector 107 can have a different index of refraction than the second reflector 109. The reflectivity of the first reflector 107 can be less than or equal to the reflectivity of the second reflector 109, for example. In certain embodiments, the reflectors 107, 109 can be sapphire crystal. Any other suitable material is contemplated herein.

In certain embodiments, the optical detector 103 can include a map configured to correlate frequency peaks to the cavity distance and/or load value as a function of temperature to account for temperature variation effects. The optical detector 103 can include any suitable optical hardware and any suitable computer hardware and/or software module(s) configured to perform any suitable functions disclosed herein, e.g., described above.

In accordance with at least one aspect of this disclosure, an optical load sensing element, e.g., 101, 201 can include a Fabry Perot load sensor having at least a first reflector and a second reflector, each reflector parallel and/or coaxially disposed and spaced to form a cavity therebetween. At least one of the first reflector and the second reflector can be moveable relative to each other such that a cavity distance between the first reflector and the second reflector is related to the load. The first reflector can have a different index of refraction than the second reflector. The optical load sensing device can be any suitable embodiment of an optical load sensing device disclosed herein, e.g., described above.

In accordance with at least one aspect of this disclosure, a method of determining a load applied to an optical load sensing element can include using narrow-band peak detection. Narrow-band peak detection can include receiving a returned optical signal, determining a plurality of frequency peaks (e.g., using a Fast Fourier Transform and/or any other suitable peak detection methodology), correlating the frequency peaks to a cavity wavelength and/or a cavity distance, and correlating the cavity wavelength and/or cavity distance to a load value. The method can include any other suitable method(s) and/or portion(s) thereof.

Embodiments can utilize a tuned laser source to sweep frequencies around the wavelength of the cavity, and allow for peak detection. Peak detection does not require an interferometer which is much simpler and cheaper than traditional systems. Embodiments also can get the optical signal out of the load path. Certain embodiments can measure the distance between the reflectors of a Fabry Perot cavity. The measured response wavelength (lambda as shown) can correspond to the actual optical distance in the cavity. For example, a number of wavelengths may be resonant and a fast Fourier transform can be used to deduce the length of the cavity. Embodiments can then correlate the change in distance to the force required to cause the change in distance in the material and/or structure used for the sensor (e.g., based on acquired data of a particular material and/or structure).

Certain embodiments allow for applications, e.g., on aircraft where electrical systems cannot be used. Embodiments can be much smaller than load cells with strain gauges, and can take up a smaller area to sense the load while not compromising the structure while sensing the entire load. Embodiments can be used in struts, for example.

Embodiments can include any types of reflectors, shapes, sizes, and have any other suitable optical function. In certain embodiments, a first reflector can be fixed relative to a second reflector, and the reflectors can be normal to the axial direction of load.

Embodiments can include a fluid chamber such that a fluid exerts a force onto the sensing element. Embodiments can utilize any suitable embodiment of a sensor, and can hang the sensor element in a sensor chamber. The change in length can be correlated to pressure and, thus, load, for example.

Certain embodiments relate to sensing methods and systems for fiber optic load sensing for vehicle health and load monitoring, structural health monitoring, and actuation feedback control.

Optical sensors and/or transducers can produce optical signals indicative of various physical phenomena, and with low power requirements. For example, optical sensors and/or transducers can produce optical signals indicative of stress, strain, temperature, tilt, rotation, vibration, pressure, etc. Various sensors and/or transducers employ various types of technologies. For example, some sensors use Fabry-Perot Interferometry (FPI). Some sensors use Fiber Bragg Grating (FBG) technologies. Some sensors use intensity modulation techniques. Some of these technologies and techniques produce optical signals having a spectrum that is indicative of the measured parameter. Embodiments can include the use of optical load sensors coupled by fiber for the purpose of monitoring and/or sensing the loaded condition of an aircraft component or structure. This can be used to provide invaluable Vehicle Health and State Awareness data in response to the sensed condition. Subsequently, it may be used for making in-flight adjustments for aircraft. Any other suitable use is contemplated herein.

Embodiments can provide load monitoring for structural and vehicle health in high EMI and harsh environments, for example. Embodiments can include an optical device for determining applied load, and can include a Fabry Perot cavity (or any other suitable device such as a Fiber Bragg Grating) coupled to a narrow-band interrogation source through an optical fiber wherein the cavity length and index of refraction changes can be correlated to the resultant force applied to the device in order to produce a load measurement.

Embodiments can provide optical measurements of loads transmitted over fiber without the need for electrical wiring or transducers. Embodiments can provide real-time resolution, fast determination of loads, simplified sensor design over WLPI, and without requiring an interferometer. Embodiments can include a coupler that can be 1×2 or 2×2 if needed for wavelength reference, for example. Embodiments can include a Fabry Perot load sensor with threaded rod ends, embedded reflectors, a fiber coupler, and off-axis optical interface, for example. Embodiments can include a two chamber hydraulic load cell with an incompressible fluid and a Fabry-Perot cavity sensor.

Embodiments can include a device used to provide an alternate method for diagnosing load distributions. While this device may be used with a wide band source (e.g. SLED) or a narrow-band source (e.g. laser), only a narrow band source may be required to interrogate the sensor, for example. Embodiments allow for methods of peak detection to be employed without the use of added interferometry to the system.

Embodiments can include a device for the designed intent of measuring applied load comprising two load bearing surfaces for supporting an axial load while transmitting said load to at least one of two or more parallel reflectors perpendicular to the axial load that comprise a Fabry Perot cavity wherein the wavelength of reflected light is proportional to the length of the cavity, and an optical path having at least two reflectors where the applied axial load is coupled to at least one reflector of the Fabry Perot cavity where the change in length of the cavity is proportional to the force applied. Media index of refraction can be different in the R1 and R2 reflectors. The reflectivity of the first reflector can be less than or equal to the reflectivity of the second reflector. The reflectors can be sapphire crystal. A narrow band source can be used comparable to the wavelength excursion of the load cell with less than 40 nm in range.

Embodiments can incorporate a feature where the optical path to and from the device does not impinge on the load bearing surfaces. This feature can be non-parallel to the load bearing surfaces. The Fabry Perot cavity ca be immersed in an incompressible fluid which translates the applied load to one or more of the reflectors. Both reflectors can be movable by the incompressible fluid. Embodiments can be integrated into a fixed structure with exactly one load bearing moveable surface (e.g. scale), for example. One non-parallel load bearing surface coupling can be disposed on the non-moveable end (e.g., a conical mating surface).

Embodiments can include a system of optical load measurement that can be configured such that the reflected wavelength of the FPR sensor can be characterized over temperature and loads in order to correlate cavity length variability to the physical parameter of applied force while compensating for thermal effects such as index of refraction changes in the transmissible material. The method of cavity length determination employed can be narrow-band peak detection.

Embodiments can include an optical device for the designed intent of determining applied load comprising of a Fabry Perot cavity coupled to a narrow-band interrogation source through an optical fiber wherein the cavity length and index of refraction changes can be correlated to the resultant force applied to the device in order to produce a load measurement.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A load sensing system for sensing a load on a structure, comprising: an optical load sensing element configured to change an optical state based on a force applied thereto; an optical source operatively connected to the optical load sensing element and configured to input an input optical signal to the optical load element; and an optical detector configured to receive a returned optical signal from the optical load sensing element, wherein the optical detector is configured to detect one or more frequency peaks of the returned optical signal and to use the one or more frequency peaks of the returned optical signal to correlate to a load value of the load and output the load value indicative of the load wherein the optical load sensing element is a Fabry Perot load sensor having at least a first reflector and a second reflector, each reflector parallel and/or coaxially disposed and spaced to form a cavity therebetween, wherein at least one of the first reflector and the second reflector are moveable relative to each other such that a cavity distance between the first reflector and the second reflector is related to the load, wherein the one or more frequency peaks correlate to one or more wavelengths of the returned optical signal which correlate to the cavity distance.

2. The system of claim 1, wherein the system does not include an interferometer.

3. The system of claim 2, wherein the optical source is a narrow band source of less than about 40 nm range.

4. The system of claim 3, wherein the optical source is a laser emitter.

5. The system of claim 1, further comprising an optical cable between the one or more of the optical source or the optical detector and the optical load sensing element, wherein at least a portion of the optical cable is at least partially non-parallel with a direction of the load.

6. The system of claim 1, wherein one of the first reflector and the second reflector is attached to a first structure portion, wherein the second reflector is attached to a second structure portion configured to move and/or flex relative the first structure due to the load.

7. The system of claim 6, wherein the first structure portion includes a threaded receiver, wherein the second structure portion includes threaded member meshed with the threaded receiver to place the second reflector relative to the first reflector and to define the cavity, wherein threads of the threaded receiver and threaded member are configured to flex due to the load applied axially to one or both of the threaded member and/or the threaded receiver.

8. The system of claim 7, wherein the first structure portion includes:
   a coupler connected to the first reflector to axially output the input optical signal; and
   an optical connector port on an outer surface of the first structure portion and in optical communication with coupler, wherein the optical connector port is configured to output the returned optical signal non-axially or to receive the input optical signal non-axially.

9. The system of claim 1, wherein the optical load sensing element is at least partially disposed within a pressure chamber, wherein the a pressure applied to the optical load sensing element correlates to the load applied to the pressure chamber.

10. The system of claim 9, wherein the optical load sensing element is completely disposed within the pressure chamber, wherein an optical cable passes through the pressure chamber in a sealed relationship.

11. The system of claim 1, wherein the first reflector has a different index of refraction than the second reflector.

12. The system of claim 11, wherein the reflectivity of the first reflector is less than or equal to the reflectivity of the second reflector.

13. The system of claim 12, wherein the reflectors are sapphire crystal.

14. The system of claim 1, wherein the detector includes a map configured to correlate frequency peaks to the cavity distance and/or load value as a function of temperature to account for temperature variation effects.

15. An optical load sensing element, comprising:
   a Fabry Perot load sensor having at least a first reflector and a second reflector, each reflector parallel and/or coaxially disposed and spaced to form a cavity therebetween, wherein at least one of the first reflector and the second reflector are moveable relative to each other such that a cavity distance between the first reflector and the second reflector is related to the load, wherein the first reflector has a different index of refraction than the second reflector.

16. The optical load sensing element of claim 15, wherein the reflectivity of the first reflector is less than or equal to the reflectivity of the second reflector.

17. The optical load sensing element of claim 16, wherein the reflectors are sapphire crystal.

18. A method of determining a load applied to an optical load sensing element, comprising using narrow-band peak detection wherein narrow-band peak detection includes receiving a returned optical signal, determining a plurality of frequency peaks, correlating the frequency peaks to a cavity wavelength and/or cavity distance, and correlating the cavity wavelength and/or cavity distance to a load value.

* * * * *